United States Patent Office 3,083,222
Patented Mar. 26, 1963

3,083,222
NEW CYCLIC DI-IMIDE ORGANO-PHOSPHORUS COMPOUNDS AND PROCESS FOR THEIR PRODUCTION
Hans Binder and Rudolf Heinle, both of Oberndorferstrasse, Roitweil (Neckar), Germany
No Drawing. Filed Feb. 12, 1958, Ser. No. 714,713
Claims priority, application Germany Feb. 18, 1957
3 Claims. (Cl. 260—461)

This invention relates to processes for the production of new classes of nitrogenous organic phosphorus derivatives, more specifically, substituted di-imides of substituted phosphonic and phosphoric acids.

Among the numerous organic derivatives of phosphorus, the phosphonic and phosphoric acid derivatives are becoming increasingly important. Both classes of compounds have the following generic formula:

With R in the case of the phosphonic acid derivatives being joined to the phosphorus atom by a carbon bond and in the phosphoric acid derivatives being joined through an oxygen bond. Thus the phosphonic acid derivatives are derivatives of phosphorus acid, viz.:

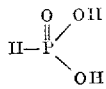

and the phosphoric derivatives are derived from phosphoric acid, the formula for which is shown below:

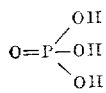

Phosphorus trichloride represents a very suitable starting material for the production of derivatives of phosphonic or phosphoric acid, the first step being the replacement of one chloride group with R to form a dichloride of the formula shown below:

By oxidation, the substituted phosphorus dichloride is converted into the phosphonic or phosphoric dichloride as shown below:

The two chloride radicals can be replaced by a large number of other radicals to yield a wide variety of substituted phosphorus compounds.

All compounds of these classes previously described, however, have had only one double bond attached to the phosphorus atom, namely the double bond between the oxygen and phosphorus atoms. The compounds of the present invention have, as substituents, other than R and O on the phosphorus atom, radicals from primary amines only.

While it would be anticipated that the interaction of one mole of the dichloride with one mole of a primary amine of the formula $ZNH_2$ would yield a compound of the general formula

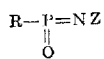

R and Z being organic radicals. Surprisingly it has been found, as confirmed by molecular weight determinations, that a cyclic di-imide is produced from the phosphoric dichloride which has the following structural formula:

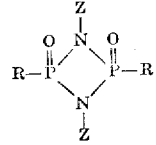

wherein R is alkyl, aryl, aralkyl, cycloalkyl or substituted derivatives thereof; aryloxy, alkoxy, aralkoxy, cycloalkoxy, and substituted derivatives thereof; and Z is alkyl, aryl, aralkyl, cycloalkyl, and substituted derivatives thereof.

In the particular case where the compound assumes the structural formula:

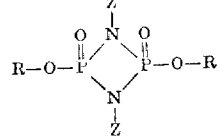

wherein R is an aromatic or hydroaromatic radical, the starting material used is generally phosphoric dichloride.

These cyclic di-imides behave like the hypothetical mono-imides would be expected to behave insofar as their degree of reactivity and the manner in which they react are concerned. In the following paragraphs these new compounds are referred to as di-phosphonic acid imides or di-phosphoric acid imides.

The reason that compounds of this type were not discovered earlier lies in the fact that the reactions conducted earlier between a mono-substituted phosphorus acid dichloride and ammonia or primary amines utilized excess ammonia or amine, thus precluding formation of the cyclic di-imide. It is necessary to use a molar ratio of amine to acid dichloride of 1:1 in order to insure di-imide formation by interaction, but two additional moles of amine are required to neutralize the two moles of hydrogen chloride formed. The moles of amine used to fix the hydrogen chloride can be recovered from the amine hydrochloride after its separation from the di-imide.

Another important condition for optimum di-imide formation is the addition of the amine slowly to the total quantity of acid dichloride, thereby insuring the presence of an excess of acid dichloride until the reaction has been completed. The two moles of amine used to react with the hydrogen chloride formed during the formation of the di-imide need not be the same as the amine which reacts to form the di-imide, but can be replaced by a tertiary amine such as pyridine. The preferred embodiment, however, does employ the same amine for both purposes because in this manner purification of the product is simplified.

It is preferred to carry out the reaction in a neutral anhydrous solvent such as benzene, toluene, xylene, or higher hydrocarbons, and the heat of reaction is generally sufficient to cause the solvent to boil. Heating after the addition of the amine is completed is generally required in order to obtain optimum yields.

In some instances, e.g., in the case of the di-phenyl phosphonic acid di-imides, the amine hydrochlorides crystallize from the reaction mixture on cooling and can be removed by filtration. The di-imide can then be purified by recrystallization after removing the solvent by distillation. In other instances, e.g., in the case of the di-imides derived from ethyl phosphonic acid dichlorides, the amine hydrochloride remains in solution with the di-imide. The hydrochloride can be removed by washing with water a solution of the di-imide in a water immiscible solvent, e.g., carbon tetrachloride. The di-imide can then be recovered by drying the carbon tetrachloride solution and removing the carbon tetrachloride by distillation.

The mixture of amine hydrochloride and di-imide can be used as such for many of the reactions employing the di-imides because the amine hydrochloride has the properties of a neutral ammonium salt and so does not interfere. In some cases, both the di-imide and the amine hydrochloride separate from the reaction mixture on cooling. The amine hydrochloride can be removed from this mixture by washing the filtered solids with water.

Some of the di-imides of the substituted phosphonic and phosphoric acids are highly crystalline solids with a sharp melting point; others, however, are syrupy or resinous in nature. Even in the case of those products which are non-crystalline, the analyses prove the correctness of the postulated structure.

The compounds described are suited to form the raw material for numerous reactions because they behave like monomolecular imides, in spite of their dimeric structure, i.e. they behave like unsaturated compounds. These reactions which do not form a subject of the present invention lead to compounds of the most different kinds in which one double linking only exists, namely the linking

These compounds may be used as insecticides, flameproof making materials, lubricants or as raw material for the manufacture of high polymer material.

The foregoing description and the following examples are for the purpose of illustration only and not for the purpose of limiting the scope of the invention which is set forth in the claims.

*Example 1*

1 mole of ethyl phosphonic acid dichloride was reacted with 3 moles of cyclohexylamine by adding drop-wise a benzene solution of the cyclohexylamine to the boiling benzene solution of the dichloride. Following the addition of all of the amine, heating under reflux temperature was continued for an additional one-half hour. When the reaction mixture was cooled, the main part of the cyclohexylamine hydrochloride crystallized and was removed by filtration. Benzene was removed from the filtrate by heating first in a water bath, and then in vacuum. In order to purify the product, the residue from the distillation was dissolved in carbon tetrachloride and the solution washed with water until a negative test for a chloride ion was obtained. The carbon tetrachloride solution was dried, and the carbon tetrachloride was removed by vacuum distillation. The di-imide so obtained was a light yellow, liquid, resinous material. It was soluble in methanol, ethanol, ether, ethyl acetate, acetone, glacial acetic acid, benzene, and toluene, but was insoluble in water and petroleum ether. The nitrogen content of the di-imide so obtained was 7.81% vs. a theoretical of 8.08%.

*Example 2*

Employing the conditions set out in Example 1, 1 mole of ethyl phosphonic acid dichloride was reacted with 3 moles of aniline. There was obtained a viscous amber-colored resin, which was a solution of aniline hydrochloride in ethyl phosphonic acid anilide which was further purified using the method of purification disclosed in Example 1.

*Example 3*

3 moles of cyclohexylamine dissolved in 100 cc. of xylene were added drop-wise to a boiling solution of 1 mole cyclohexyl phosphonic acid dichloride in 300 cc. of xylene. When the addition was complete, heating at reflux temperature was continued for an additional one-half hour. The solid which separated on cooling was filtered, washed with petroleum ether, and after the petroleum ether had been removed, the crude product was washed with water until the test for chloride was negative. The crystalline product was further purified by washing with acetone, and was analytically pure after several additional crystallizations from toluene. The compound was soluble in methanol, ethanol, benzene, toluene, acetone, dioxane, tetrahydrofurane; insoluble in water and petroleum ether. The nitrogen content of the recrystallized product was 5.95% vs. a theoretical of 6.16%, the melting point was 240–242° C., the molecular weight for $C_{24}H_{44}O_2N_2P_2$ theoretically was 454.59, for the recrystallized product was 473.

*Example 4*

1 mole of phenyl phosphonic acid dichloride was reacted with 3 moles of methylamine in boiling benzene solution as described in the preceding examples. On cooling the solution, methylamine hydrochloride separated and was removed by filtration and after removing the benzene by distillation, the residue was recrystallized from hot methanol. The nitrogen content of the recrystallized product was 8.97% vs. a theoretical of 9.15%.

*Example 5*

Employing the process of the preceding examples, 1 mole of phenyl phosphonic acid dichloride was reacted with 3 moles of benzylamine in boiling benzene solution. On cooling, the benzylamine hydrochloride separated, and the benzene was removed from the filtrate by distillation. The solid product remaining was crystallized from ethyl acetate. The white crystalline material had a nitrogen content of 5.77% vs. a theoretical of 6.12%.

*Example 6*

1 mole of phenyl phosphonic acid dichloride was reacted with 3 moles of cyclohexylamine in boiling benzene solution, and heating under reflux was continued for one and one-half hours after the addition was complete. On cooling, cyclohexylamine hydrochloride precipitated, and was removed by filtration. The benzene was removed from the filtrate by vacuum distillation and the residue was recrystallized twice from dry carbon tetrachloride. The purified solid so obtained had a melting point of 199–200° C. and was soluble in benzene, chloroform, anisole, cyclohexanone, ethylene dichloride, and also in hot carbon tetrachloride, monochlorobenzene and ethanol. The nitrogen content of the product was 6.30% vs. a theoretical of 6.33%, the molecular weight for $C_{24}H_{32}O_2N_2P_2$ was 449. vs. a theoretical of 442.5.

*Example 7*

A solution of 3 moles of hexamehtylene diamine in 2400 cc. of xylene was added drop-wise to a boiling solution of 2 moles of phenyl phosphonic acid dichloride in 600 cc. of xylene, excluding moisture. When the diamine addition had been completed, heating under reflux was continued for an additional three hours. On cooling the reaction product, bis-phenyl phosphonic acid hexamethylene diamine hydrochloride separated as an amorphous, brittle, yellow solid, in practically a quantitative yield. The solid was separated by filtration, washed with petroleum ether, and after removal of the petroleum ether by vacuum distillation was washed with water until a negative test for chloride ion was obtained. The dried solid was recrystallized from methanol and the purified reaction product was a yellow, brittle, pulverizable resin which was soluble in methanol and glacial acetic acid; insoluble in water, chloroform, carbon tetrachloride, benzyl chloride, benzene, toluene, xylene, dioxane, ether, acetone nitrile and petroleum ether. The formula for the product is as follows:

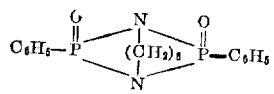

Example 8

3 moles of cyclohexylamine were reacted with 1 mole of benzyl phosphonic acid dichloride in boiling xylene solution, as described in the preceding examples. When the addition of cyclohexylamine was complete, heating was continued for an additional one and one-half hours at reflux temperature. On cooling the cyclohexylamine hydrochloride separated and was removed by filtration, and the xylene was removed from the filtrate by vacuum distillation. The crude imide so obtained was dissolved and freed of hydrochloride by pouring the methanol solution in the water. The purified imide so obtained was a light yellow, brittle, resinous solid which was soluble in methanol, ether, ethyl acetate, acetone, chloroform, carbon tetrachloride, dioxane, xylene; but insoluble in water, petroleum ether and acetonitrile.

The compound so obtained is the dibenzyl phosphoric acid cyclohexyl imide of the formula $C_{26}H_{36}O_2N_2P_2$ and the structural formula:

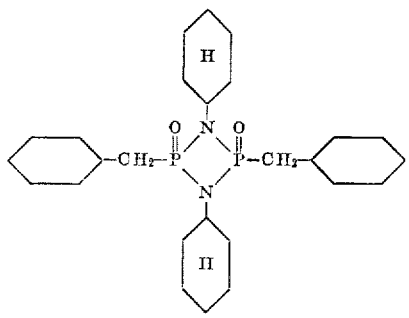

Molecular weight—470.5
Nitrogen content—5.96% vs. a theoretical content of 5.96%.

Example 9

A benzene solution of 3 moles of anhydrous methylamine was added drop-wise to a boiling benzene solution of 1 mole of phosphoric acid phenyl ester dichloride under agitation and with the exclusion of moisture. When the addition was complete, heating at reflux was continued for an additional one-half hour. The benzene was then removed by distillation, and the residue was dissolved in chloroform. The chloroform solution was extracted with water to remove the methylamine hydrochloride, and after drying the chloroform solution, the chloroform was removed by distillation. The reaction product was a viscous noncrystalline amber-colored resin, soluble in ether, chloroform, methanol, acetone, benzene, toluene, and insoluble in water and petroleum ether. The product, diphosphoric acid phenyl ester methyl-imide, had a nitrogen content of 8.5% versus a calculated theoretical of 8.28% and a phosphorous content of 18.19% versus a calculated theoretical of 18.31%.

Example 10

2 moles of phosphoric acid phenyl ester dichloride were heated with one mole of hexamethylene diamine in four moles of pyridine in a bomb, first for three hours at 150° C. followed by three hours at 180° C. On cooling the bomb, the reaction mixture separated into two layers, the upper of which consisted mainly of pyridine hydrochloride and the lower was a viscous, tacky, yellow-brown liquid. In order to remove the pyridine hydrochloride, the mass was dissolved in methanol and the solution was poured into water in a fine stream, whereupon the reaction product precipitated. This process was repeated until a negative chloride ion test was obtained. When all the pyridine hydrochloride had been removed, the product was redissolved in methanol, and the methanolic solution dried over anhydrous sodium sulfate. After removal of the methanol by distillation, the bis-phosphoric acid phenyl ester hexamethylene imide was obtained as a relatively pure, brittle, amber-colored resin.

In order to obtain an analytically pure product, the relatively pure product was dissolved in methanol, and the methanol solution treated with activated charcoal. On removal of the methanol by distillation, the analytically pure imide was obtained.

The compound was soluble in methanol, ethanol, acetone, dioxane, tetrahydrofurane, chloroform, dimethyl formamide, glacial acetic acid, and insoluble in water, ether, ethyl acetate, benzene, chlorobenzene, and carbon tetrachloride. It had the following formula:

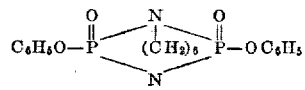

The molecular weight was determined in glacial acetic acid, and a value of 419.5 was obtained versus a theoretical molecular weight of 392.3 for the compound $C_{18}H_{22}O_4N_2P_2$. The nitrogen content was 7.10% versus a theoretical of 7.14% and the phosphorus content was 15.9% versus a theoretical of 15.8%.

Example 11

Using the process as set forth in Example 10, three moles of hexamethylene diamine were substituted for the three moles of cyclohexylamine. On cooling, approximately 7% of the cyclohexylamine hydrochloride crystallized, and was removed by filtration. The remainder of the cyclohexylamine hydrochloride was removed by shaking the benzene solution with water. The pure bisphosphoric acid phenyl ester cyclohexylimide so obtained was a viscous amber-colored resin which did not crystallize. It was soluble in ether, chloroform, carbon tetrachloride, methanol, ethanol, benzene, toluene, but insoluble in water and petroleum ether.

The nitrogen content was 5.7% versus a theoretical of 5.91% and a molecular weight (determined in glacial acetic acid) was 489 versus a theoretical of 474.

Example 12

3 moles of benzylamine were reacted with 1 mole of phosphoric acid phenyl ester dichloride employing the process of the preceding examples. However, a benzine with a boiling point of 160° was used in the place of benzene because the di-imide does not form at lower temperatures. A viscous brown resin was obtained which was a mixture of benzylamine hydrochloride and the bisphenyl ester phosphoric acid benzylimide. The benzylamine hydrochloride was removed from the product using the previously described method.

Example 13

400 cc. of xylene were placed in a three-neck, round-bottom 2-liter flask equipped with stirrer, reflux condenser, and two dropping funnels. The xylene was heated to boiling and 170 g. of phosphoric cyclohexyl ester dichloride diluted to 200 cc. volume with xylene was added to one of the dropping funnels. 230 g. cyclohexylamine diluted to 800 cc. volume with xylene was added to the other dropping funnel and the ester dichloride and amine added drop-wise in the ratio of 1:4 by volume. When the addition of both components was complete, heating at reflux was continued for an additional hour. On cooling, the cyclohexylamine hydrochloride separated and was removed by filtration. The filter cake was washed several times with xylene, the washings being added to the xylene filtrate. Xylene was removed from the filtrate by vacuum distillation, and the solid remaining was dissolved in carbon tetrachloride. The carbon tetrachloride solution was washed with water until the chloride test was negative. The carbon tetrachloride solution was dried over sodium sulfate and the solvent was removed by distillation. The remaining solid was dissolved in acetone and the flocculent impurities which separated were removed by filtration. After the removal of the acetone by distillation, finally in vacuum at 70° C., the diphosphoric cyclohexyl ester cyclohexylimide remained as a solid amber-colored amorphous product.

The compound was soluble in methanol, acetone, chloroform, acetonitrile, benzene, nitrobenzene, anisole, and dioxane and was insoluble in water, ethyl acetate, ether and petroleum ether. It has the following structural formula:

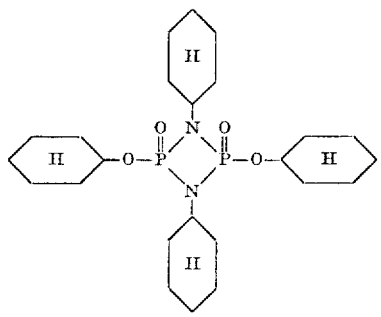

The theoretical molecular weight for the compound of the formula $C_{24}H_{44}O_4N_2P_2$ is 486.59. The value obtained was 519. The nitrogen content of the product was 5.68% versus a theoretical of 5.76%, and the phosphorus content was 12.5% versus a theoretical of 12.73%.

Two moles of pyridine can be substituted for the 2 moles of cyclohexylamine to react with the hydrogen chloride released.

The phosphoric cyclohexyl ester dischloride is produced as follows, in which preparation the phosphorus acid cyclohexyl ester dichloride is an intermediate:

100 g. freshly distilled cyclohexanol (1 mole) were added quickly drop-wise to 137 g. phosphorus trichloride (1 mole) at 100° C. under stirring and refluxing. A slow stream of nitrogen was passed through the apparatus. When the addition was complete, heating with stirring was continued for an additional twenty-five minutes. After the hydrogen chloride had been removed, the reaction mixture was distilled in high vacuum under nitrogen. After three distillations, the dichloride was obtained as a colorless liquid with acrid odor and a boiling point at 2 mm. of 62° C. The theoretical chlorine content of the product so produced was 35.20% versus a theoretical of 35.27% for the compound of the formula $C_6H_{11}OCl_2P$. The phosphorus acid cyclohexyl ester dichloride so obtained was converted into the phosphoric cyclohexyl ester dichloride as follows:

Oxygen in a fine stream was passed into 50 g. of phosphorus acid cyclohexyl ester dichloride for three to four hours at a temperature of about 30° C. The reaction was complete when the temperature stopped rising. The product so obtained was pure phosphoric cyclohexyl ester dichloride which was a transparent acrid-smelling fuming liquid which could not be distilled without decomposition even at vacuum of 1 mm. Chlorine content of the product so produced was 32.60 versus a theoretical value of 32.67 for the compound of which $C_6H_{11}O_2Cl_2P$.

What is claimed is:
1. A compound having the structural formula:

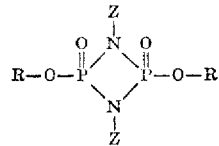

wherein R is a member of the group consisting of phenyl, phenylmonomethyl, phenyldimethyl, phenylmonoethyl, phenyldiethyl, cyclohexyl, methylcyclohexyl, dimethylcyclohexyl, ethylcyclohexyl, diethylcyclohexyl and wherein Z is a member of the group consisting of methl, ethyl, propyl, butyl, pentyl, hexyl, cyclohexyl, methylclclohexyl, ethylcyclohexyl, dimethylcyclohexyl, diethylcyclohexyl, phenyl, methylphenyl, dimethylphenyl, ethylphenyl, diethylphenyl, benzyl, methylbenzyl, dimethylbenzyl, ethylbenzyl, diethylbenzyl, phenylethyl, methylphenylethyl, dimethylphenylethyl

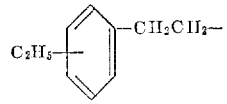

diethylphenylethyl and a single group common to both nitrogen atoms, such as ethylene, propylene, butylene, pentylene or hexylene.

2. A process for producing the nitrogenous, organic phosphorus compound of claim 1 which comprises reacting a phosphorous compound having the formula:

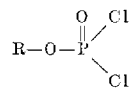

wherein R is a member of the group defined for the radical R in claim 1 with a primary amine of the formula $ZNH_2$, wherein Z is a member of the group as defined for the radical Z in claim 1 and wherein the mol ratio of phosphorus reactant relative to the amine is 1:3.

3. The process of claim 2 wherein both the phosphorus compound and the amine are in organic solution, the reaction taking place at the boiling temperature of the solvent and at least one of the reactants being added dropwise to the boiling solution.

References Cited in the file of this patent
UNITED STATES PATENTS

| | | |
|---|---|---|
| 2,382,309 | Hamilton | Aug. 14, 1945 |
| 2,635,112 | Fields | Apr. 14, 1953 |
| 2,648,706 | Lewis et al. | Aug. 11, 1953 |
| 2,662,095 | Isham | Dec. 8, 1953 |
| 2,795,609 | Jensen et al. | June 11, 1957 |
| 2,798,086 | Coover | July 2, 1957 |
| 2,852,550 | Godfrey | Sept. 16, 1958 |
| 2,870,190 | Burgert | Jan. 20, 1959 |

OTHER REFERENCES

Michaelis, Liebig's Annalen 326, 140–167 (1903).
Autenrieth et al., Ber. Deut. Chem. 58, 2144–2150 (1925).
Autenrieth et al. Ber. Deut. Chem. 58B 840–847 (1925) cited in Chemical Abstracts 19, 2325 (1925).
Smith et al. Chemical Abstracts 51, p. 16330a (1957).

UNITED STATES PATENT OFFICE
CERTIFICATE OF CORRECTION

Patent No. 3,083,222                          March 26, 1963

Hans Binder et al.

It is hereby certified that error appears in the above numbered patent requiring correction and that the said Letters Patent should read as corrected below.

Column 4, line 58, before "diamine" insert -- imide as well as hexamethylene --; column 5, line 17, for "phosphoric" read -- phosphonic --; column 6, line 36, for "5.7%" read -- 5.75% --; line 44, for "160°" read -- 160° C. --.

Signed and sealed this 3rd day of December 1963.

(SEAL)
Attest:

ERNEST W. SWIDER

Attesting Officer

EDWIN L. REYNOLDS

Acting Commissioner of Patents